(12) United States Patent
Vichare et al.

(10) Patent No.: US 8,479,024 B2
(45) Date of Patent: Jul. 2, 2013

(54) SYSTEM AND METHOD FOR CUSTOMIZING INFORMATION HANDLING SYSTEM INTERNAL POWER SOURCE AND SERVICE OFFERINGS BASED ON USAGE PROFILES

(75) Inventors: Nikhil M. Vichare, Austin, TX (US); Claude Lano Cox, Austin, TX (US); Edwin Coleman Tinsley, Austin, TX (US); Bruce Miller, Plano, TX (US); Richard C. Thompson, Cedar Park, TX (US); Shirish Gupta, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 385 days.

(21) Appl. No.: 12/872,223

(22) Filed: Aug. 31, 2010

(65) Prior Publication Data

US 2012/0054474 A1 Mar. 1, 2012

(51) Int. Cl.
*G06F 1/26* (2006.01)
(52) U.S. Cl.
USPC .......................................... 713/300; 713/340
(58) Field of Classification Search
None
See application file for complete search history.

(56) References Cited

U.S. PATENT DOCUMENTS

| 7,143,007 | B2 | 11/2006 | Long et al. |
|---|---|---|---|
| 7,302,681 | B2 | 11/2007 | Kamalanathan |
| 7,424,439 | B1 | 9/2008 | Fayyad et al. |
| 7,760,127 | B2 | 7/2010 | Sutardja |
| 7,904,319 | B1 | 3/2011 | Whear et al. |
| 2004/0141003 | A1 | 7/2004 | Nivers et al. |
| 2005/0062455 | A1* | 3/2005 | Stavely et al. ............... 320/106 |
| 2005/0177825 | A1 | 8/2005 | Kamalanathan |
| 2008/0317432 | A1 | 12/2008 | George |
| 2010/0036628 | A1* | 2/2010 | Plestid ............................ 702/63 |

* cited by examiner

*Primary Examiner* — Dennis M Butler
(74) *Attorney, Agent, or Firm* — Terrile, Cannatti, Chambers & Holland, LLP; Robert W. Holland

(57) ABSTRACT

Usage data monitored at information handling systems is collected and analyzed to provide a basis for component selection for information handling systems by associating components with end user usage profiles. For example, a monitor tracks usage data at an end user information handling system and determines that the end user's usage falls within usage pattern defined by analysis of plural other end users. The end user is directed towards selection of components associate with the defined usage pattern to replace components of the information handling system or for use in a replacement information handling system. Analysis on an enterprise-wide basis helps an enterprise to allocate components and information handling systems to end users of an enterprise.

19 Claims, 11 Drawing Sheets

| | |
|---|---|
| Thermals | CPU, motherboard, graphics, skin and memory temp, fan RPM |
| Mechanicals | Hinge cycles, battery insertions, docking cycles, AC insertions |
| Hard Disk Drive | Bytes read/write, idle/read/write time, temp, SMART logs |
| Networking | Wired activity, wireless activity |
| Battery | RSOC, current, voltage, power, cycles, temp, MA |
| Performance | Memory, CPU usage and throttling, C-states |
| Power | Battery/external power time, power cycles, external power usage, power management |
| Display | Brightness values |
| Sensor | Sensor card readings for operating conditions (e.g., vibration, temp, humidity ... |
| System Hardware | System type, BIOS version, HDD size, RAM size, unique identifiers |

*Figure 2*

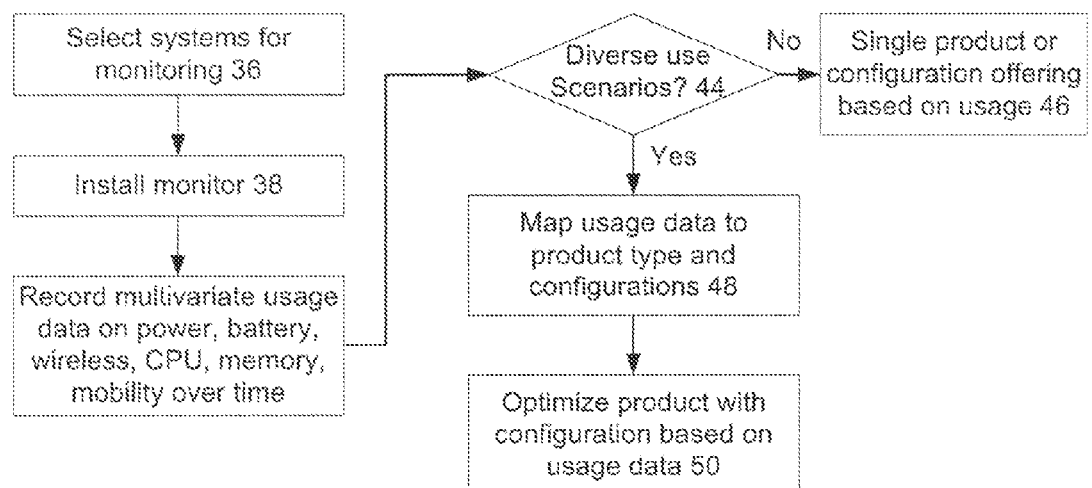

*Figure 3*

SYSTEM AND METHOD FOR CUSTOMIZING INFORMATION HANDLING SYSTEM INTERNAL POWER SOURCE AND SERVICE OFFERINGS BASED ON USAGE PROFILES

CROSS REFERENCE TO RELATED APPLICATIONS

U.S. patent application Ser. No. 12/872,150, entitled "System And Method For Customizing Information Handling System Product And Service Offerings Based On Usage Profiles" by inventors Nikhil Vichare, Claude Cox, and Edwin Tinsley, filed on Aug. 31, 2010, describes exemplary methods and systems and is incorporated by reference in its entirety.

BACKGROUND OF THE INVENTION

1. Field of the Invention

The present invention relates in general to the field of information handling system product and service offerings, and more particularly to a system and method for customizing information handling system product and service offerings based on usage profiles.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have become powerful tools for accomplishing enterprise and personal tasks. Increased processing power built into portable housings having wireless networking means that an end user can perform complex tasks nearly anywhere. Greater networking bandwidth and storage capacity as well virtualization tools means that an information technology department has tremendous flexibility in adjusting processing needs and reacting to processing, networking or storage issues as the issues arise. One reason for the wide acceptance of information handling systems is that each information handling system can have a hardware or software configuration that is directed towards a particular task or set of tasks. Customization helps to ensure that goals set for a particular information technology function will succeed because the hardware and software components of customized information handling systems have the capabilities needed to meet the goals. Often, individuals and enterprises have information handling systems built-to-order with particular tasks kept in mind. That is, an end user selects particular hardware and software components for an information handling system order and then a manufacturer builds the information handling systems to the specifications of the end user's order. An order can specify an number of hardware and software components, such as the processor speed, the operating system, amount and speed of volatile memory (like DRAM), the amount and speed of non-volatile memory (like a hard disk drive or a solid state drive), networking components, display quality, etc. . . .

One difficulty with information handling systems is that the sometimes dizzying array of available component configurations often leads to end user confusion regarding the best component for the end user to select. An end user can keep the price of an information handling system lower by including less-capable components, however, the system may not perform as well as an end user desires. An end user can purchase a system with more capable components, however, often the end user does not fully utilize the capabilities of the components so that the extra cost of more capable components is not justified. For example, an end user who stores photos and videos on a desktop information handling system might select a large and somewhat more expensive hard disk drive. The same user might rely on a portable information handling system for traveling and word processing, thus having less need for large quantities of non-volatile storage. Rather than spending extra money on more hard disk storage, such a user might get more value from a solid state drive that offers less storage but more rapid start-ups. Given the large number of available component choices, end users often have difficulty deciding on the particular components that best suit their needs in an information handling system.

SUMMARY OF THE INVENTION

Therefore a need has arisen for a system and method which analyzes information handling system usage to customize an upgrade or a configuration of a replacement for the information handling system.

In accordance with the present invention, a system and method are provided which substantially reduce the disadvantages and problems associated with previous methods and systems for configuring an information handling system for use by a particular end user. Usage data is monitored at plural information handling systems to define usage patterns for components. An information handling system is monitored for usage data that is compared with the usage patterns to determine whether components are efficiently utilized in a cost effective manner. Based upon component usage data, replacement components or replacement information handling system configurations are provided for an end user associated with the information handling system.

More specifically, information handling systems are built from plural components, such as a processor, RAM, a hard disk drive and a battery. Each component is available in a number of different types, such as processing speeds, storage size and charge. To aid selection of components for an end user to include in an information handling system, the end user's legacy information handling system is monitored during operations to track usage data, such as processor utilization, RAM page counts, and battery discharges. The usage data is compared with threshold values that are developed from historical usage data information to determine if the components of the legacy information handling system properly utilized. If the legacy information handling system components are underutilized, then a replacement information handling system can have a reduced cost by including less-capable components. If the legacy information handling system components are over utilized, then a replacement information handling system can include more-capable components to better meet the needs of the end user. Monitoring in an enterprise environment allows the enterprise to allocate information handling systems within the enterprise based upon the relative usage of each end user.

The present invention provides a number of important technical advantages. One example of an important technical advantage is that an end user has an independent and neutral basis for making an informed decision about the configuration of an information handling system that best fits the end user. Usage data gathered over time provides a quantitative measure of the degree to which an end user utilizes configurable components. To provide a sense of relative usage, the end user can compare his usage with that of other users, thus obtaining a perspective on relative utilization of components. An enterprise that purchases information handling systems for employees can define components based on employee usage so that resources are spent more effectively to purchase information handling systems that fit employee needs. Rather than using arbitrary classifications based upon job title or office location, using actual quantitative usage history allows rational allocation of limited resources that will help employees get the most from their information handling systems.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 depicts a table of components and parameters monitored at an information handling system by one or more monitors running on the information handling system;

FIG. 3 depicts a flow diagram of an example of a process for selecting information handling system components based upon usage data;

DETAILED DESCRIPTION

Tracking actual usage data of information handling systems provides a quantitative basis for configuring the components of the information handling systems or replacement information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
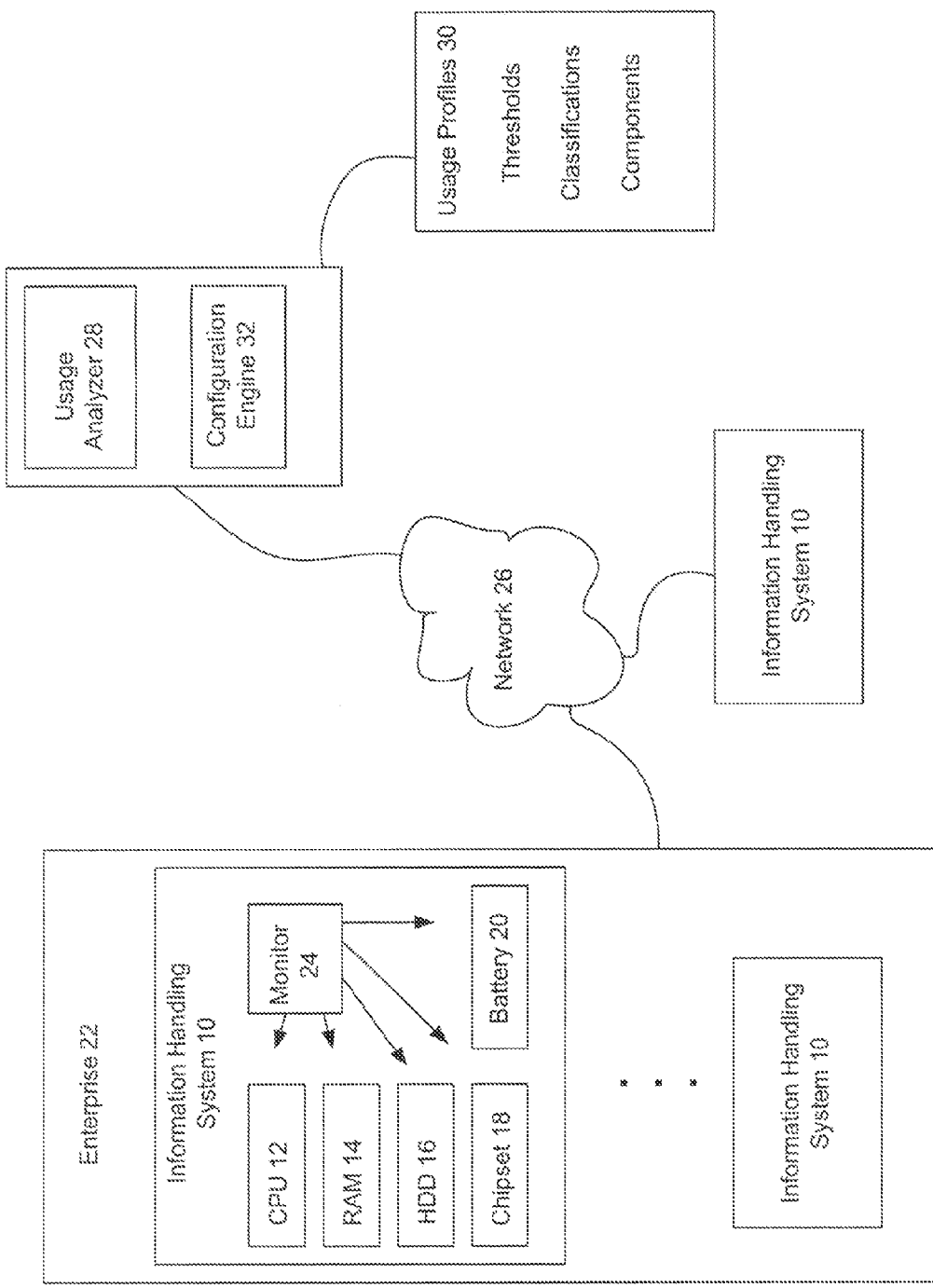
FIG. 1 depicts a block diagram of a system for collecting, analyzing and applying information handling system usage data.

Referring now to FIG. 1, a block diagram depicts a system for collecting, analyzing and applying information handling system usage data. Information handling systems 10 are built from a variety of components that cooperate to process information, such as a CPU 12, RAM 14, and hard disk drive 16 and a chipset 18. Information handling systems 10 generally fall into several classifications, such as portable systems that are capable of operating free from external power or other physical interfaces, tablets that are portable systems with touch screens that are built or fold into a compact form, desktop systems that operate in fixed locations with external power and peripherals, workstation systems that have advanced computing capabilities, cell phones or similar miniature systems, and server systems that serve client systems through a network. Portable information handling systems typically include an integrated rechargeable battery 20 that provides power for the components when the information handling system is not interfaced with an external power source, such as an AC outlet. Often enterprises 22, such as corporations, small businesses, government entities, and educational systems, equip their employees with information handling systems based upon the duties of the employees. For example, traveling employees who work away from an office environment often use portable information handling systems while office-based employees typically have desktop systems assigned to a physical office location. Individuals tend to purchase information handling systems with different component configurations based upon personal preferences, anticipated use and cost.

In order to collect usage data from information handling systems 10, a monitor is deployed to enough information handling systems to capture statistically significant usage data for hardware, operating system and application use of resources for each type of information handling system of interest, such portable, desktop and handheld information handling system categories. Monitoring is performed with a set of instructions running on one or more processors, such as firmware instructions running on a system BIOS, which lack a user interface and is therefore free of interference from an end user. Monitoring parameters include those set forth in FIG. 2, such as hard disk drive use, battery use, memory use, CPU use, network use, power states and cycling, mechanical handling and other parameters. Each monitor 24 of each information handling system 10 sends usage data through a network 26 to a usage analyzer 28 where the data is stored, such as in a SQL database. Each monitor 24 can include unique identification data for the information handling system 10 that supports the monitor, or can send data anonymously if the data is only for generally modeling. Usage analyzer 28 indexes the usage data by system identifier, system type and component and analyzes the data to prepare usage profiles that associated components with usage data. Once usage profiles 30 are prepared, a configuration engine 32 applies an individual information handling system's usage data with the usage profiles to associated types of components for configuration of the information handling system, such as to modify an existing information handling system or replace the existing information handling system. The results of the application of a set of usage data to the usage profiles 30 are presented through a graphical user interface 34.

In one embodiment, thresholds for usage profiles 30 are built from benchmark values developed from a large statistically significant dataset of usage data gathered by monitors 24 for information handling systems having similar hardware configurations, software configurations, user types of industry segments or similar characteristics. In an alternative embodiment thresholds are developed using rule sets arrived at with expertise associated with a particular domain, such as users of a common enterprise 22. Alternatively, a combination of statistical and rule-based values define a given usage profile and components associated with the usage profile. As an example, multi-variate data gathered by monitors 24 is analyzed using a non-hierarchical clustering method to identify groups with maximum homogeneity within groups and maximum homogeneity between groups. For instance, K-means clustering identifies specific clusters of users based upon usage patterns. Once usage analyzer 28 identifies clusters, rules associate clusters with components and information handling systems that meet the actual needs of the users in each cluster. The configuration engine 32 associates the usage data of the legacy information handling system and components to an appropriate cluster for the end user based on similarities of the end user's data to that of the cluster. Once the association is made the rules provide the replacement components or information handling system for the end user.

Configuration engine 32 aids selection of replacement components for an information handling system or selection of components for a replacement information handling system. An end user runs monitor 24 on the end user's current information handling system for a time sufficient to generate statistically significant data, such as a week, with the time based upon the type of components being monitored and historical analysis of monitoring that indicates sufficient monitoring. The usage data generated by monitor 24 is sent as raw data to configuration engine 32 or, alternately compresses into a summary XML file that captures key statistics that explain variability in individual parameters using descriptive statistics and histograms. In one alternative embodiment, configuration engine 32 executes on the end user's information handling system so that the end user's usage data remains private. Configuration engine 32 compares the usage data of the end user with thresholds developed from analysis of other usage data to suggest components for use in the current information handling system or selection of components to replace the current information handling system of the end user. In one embodiment, an enterprise 22 runs monitor 24 on plural enterprise information handling systems 10 to determine whether enterprise end user usage data indicates that information handling systems are allocated to end users based on the usage of the information handling systems and the capabilities of the information handling systems. For example, information technology administrators can re-assign information handling systems among enterprise end users so that information handling system capabilities better match the usage of the information handling systems by enterprise end users.

Referring now to FIG. 3, a flow diagram depicts a process for selecting information handling system components based upon usage data. The process begins at step 36 with selection of information handling systems to monitor for usage data, such as selected systems in use by enterprise employee end users. At step 38, a monitor is loaded on each information handling system to gather usage data. At step 40, the monitor at each information handling system gathers multivariate data on usage of the information handling system, such as power, battery, CPU, memory, mobility and other usage, over a predetermined time period. At step 42, the usage data is sent from the information handling systems through a network to an analyzer that analyzes the usage data to define usage patterns associated with the usage data and to associate the usage patterns with one or more components of different types. For example, the analysis applies clustering methods to separate users based on usages data patterns. In one embodiment, usage data is ranked by percentile wherein a percentile value represents the percent of similar systems having a value below a given ranking. The percentile calculation is conducted with summary usage data rather than raw data, where the summary parameters are summary statistics calculated from raw data over a defined length of time. For example, raw data might track hard disk drive bytes written every few seconds while the summary parameter is cumulative writes in GB over X hours.

At step 44, a determination is made of whether the usage data is sufficient to represent a diverse use scenario that will support modeling. If not, the process continues to step 46 where a single product or configuration is offered based upon the usage data. If at step 44, adequate usage data diversity exists, the process continues to step 48 to map usage data to appropriate product types and configurations. In one embodiment, a percentile table is created for each component of interest having three classifications: underutilize, upgrade and optimal. Business rules, such as the cost of a component of interest, determines what percent of usage data fall into each category. In one example embodiment, rankings below the $25^{th}$ percentile means the component is underutilized; rankings between the $25^{th}$ and $75^{th}$ percentile means the component is optimally utilized; and rankings above the $75^{th}$ percentile means the component is over utilized and should be upgraded. Once the classifications are determined, the process continues to step 50 to apply the classifications to other end user usage data for aiding the selection of components for an information handling system of the end user.

Figure 4:
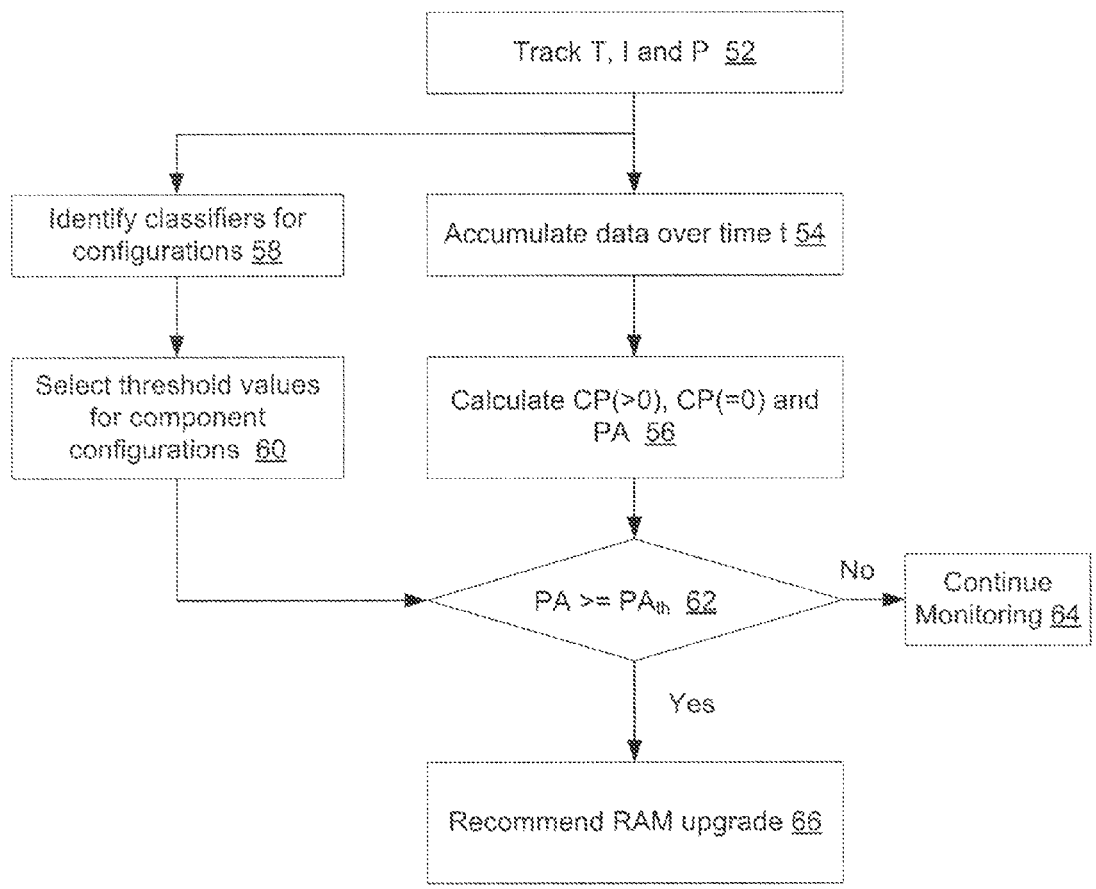
FIG. 4 depicts a flow diagram of one example embodiment of a process for selecting memory configurations based upon usage data.

Referring now to FIG. 4, a flow diagram depicts one example embodiment of a process for selecting memory configurations based upon usage data. The process begins at step 52 by tracking the total operational time of a system (T), the fraction of operational time that is idle time (I), and the paging activity of memory in Pages/sec measured over operational time T. At step 54, usage data T, I and P is tracked and accumulated over a predetermined time t. At step 56, the usage data is analyzed by determining a count of paging P that is greater than 0 (CP(>0)), a count of paging where paging is 0 (CP(=0)) and a percent of paging activity (PA) where:

$$PA=[CP(>0)/(CP(>0)+CP(=0))]$$

At step 58, classification rules are identified for information handling system configuration and at step 60 a threshold value is selected for the classification rules. At step 62, the value of PA is compared with the threshold values to determine if the memory falls within a classification. If paging activity PA is not less than or equal to a threshold associated with at least an optimally configured system, the process continues to step 64 for continued monitoring in case memory usage changes. If the paging activity is greater than or equal to the threshold value, the process continues to step 66 to recommend a RAM upgrade, such as an addition of RAM to an existing information handling system or a replacement information handling system having additional RAM.

Figure 5:
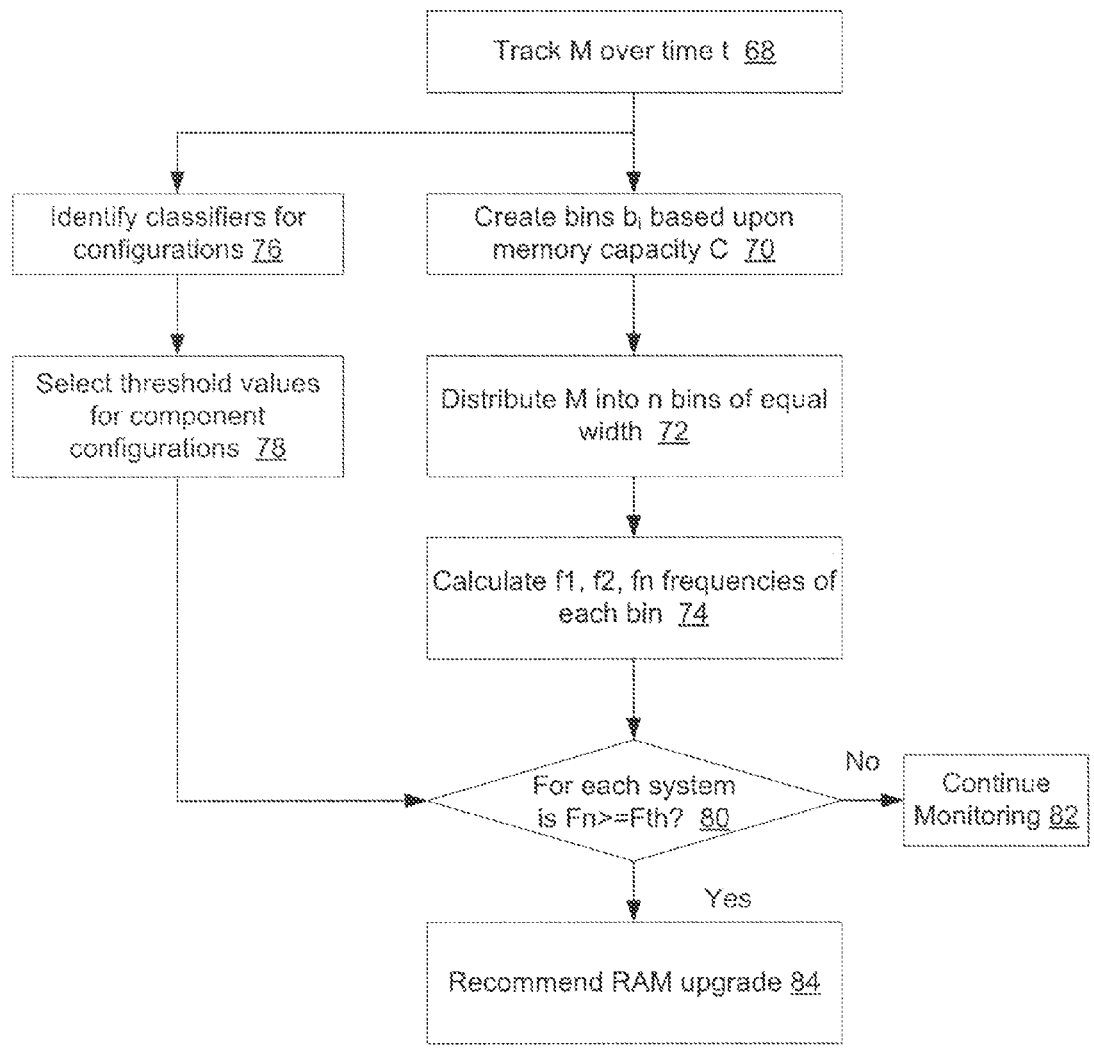
FIG. 5 depicts a flow diagram of another example embodiment of a process for selecting memory configurations based upon usage data.

Referring now to FIG. 5, a flow diagram depicts another example embodiment of a process for selecting memory configurations based upon usage data. The process begins at step 68 by tracking memory space (M) over time t. Memory space is the space occupied at different instances in time and is a random variable with known upper and lower limits that match the memory capacity of the information handling system being monitored. At step 70 bins b1 through bn are created for the memory capacity C, such as by breaking the capacity into 4 equal bins each having a partial capacity of 25% of total capacity. At step 72, the memory space occupied is distributed into n bins of equal width. At step 74, frequencies f1 to fn are calculated for each bin where f1 to fn are frequencies of the bins bi, for corresponding values of M such that the sum of bins times frequencies for all of the bins equals 1. At step 76, classification rules are identified for the information handling system configuration and at step 78 a threshold value is selected for the classification rules. At step 80 a determination is made of whether for each information handling system the determined frequency is greater than or less than a threshold frequency. Since the bins are created as a fraction of the total RAM capacity, the frequencies of higher bins b(n) indicates if the upper limit of RAM capacity is reached and how often. Thus, the frequency value is a summary parameter indicative of memory utilization. If at step 80 the frequency of bin b(n) system memory is not greater than or equal to a threshold frequency, the process continues to step 82 to continue monitoring memory utilization. If at step 80 the frequency of a system is greater than or equal to the threshold, the process continues to step 84 to recommend a memory upgrade.

Figure 6:
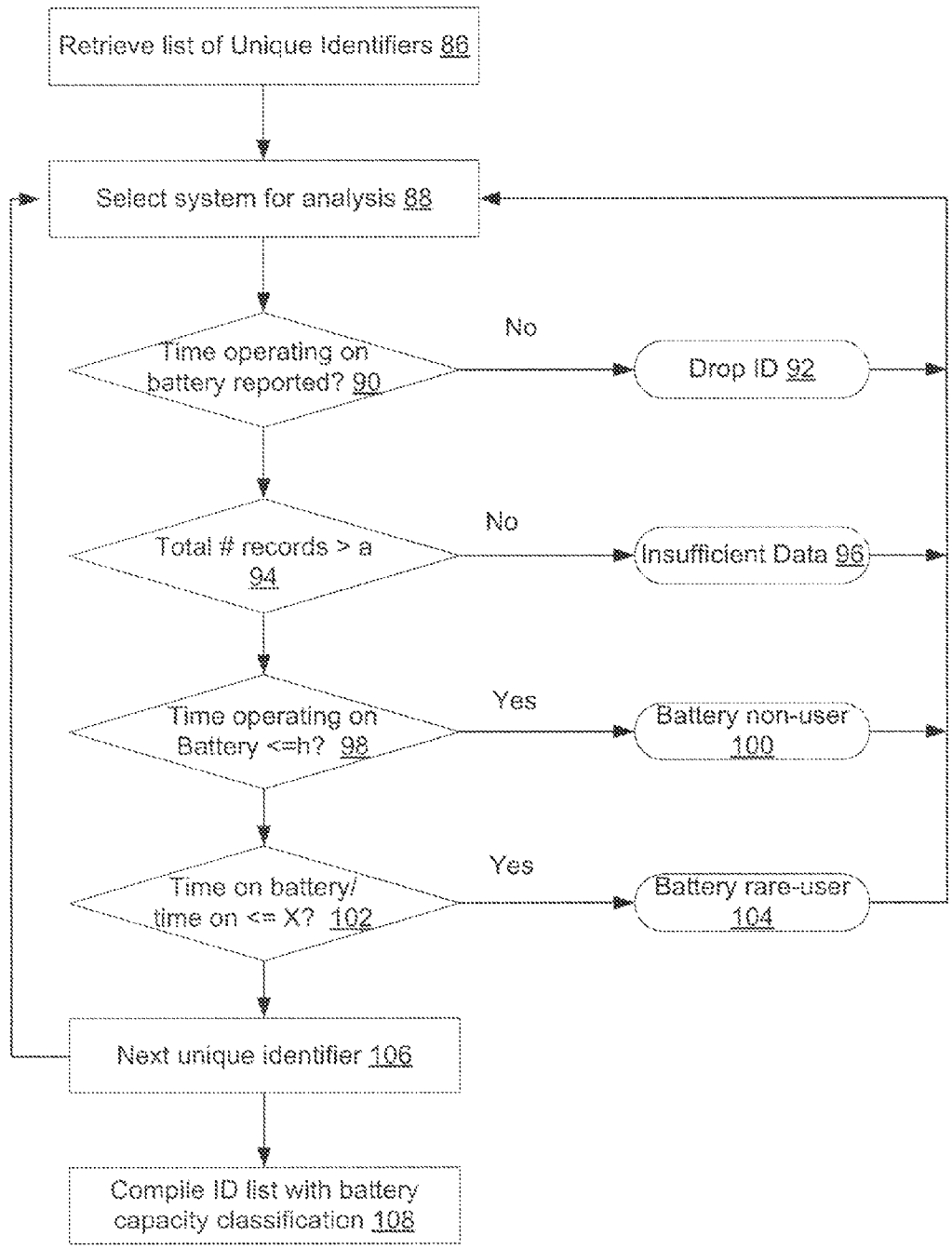
FIG. 6 depicts a flow diagram of one example embodiment of a process for selecting battery configurations based upon usage data.

Referring now to FIG. 6, a flow diagram depicts one example embodiment of a process for selecting battery configurations based upon usage data, such as hours operating on battery power, hours operating on external power and total hours operating. To perform an analysis, raw usage data is summarized as cumulative values of hours on battery per day, hours on external power per day and total hours on per day over a predetermined number of days. Thresholds in the example embodiment are total number of records for a system (a), hours on battery for the system (h) and the ratio of hours on battery over total hours on (x). The process starts at step 86 with a list of system identifiers for analysis. At step 88, a system is selected for analysis and all records for the system are retrieved. At step 90, a determination is made of whether a value is report for hours on battery and, if not, at step 92 the identifier is dropped from analysis and the process proceeds to the next system at step 88. If yes at step 90, the process continues to step 94 for a determination of the total number of records for the system identifier. If the total number of records is not greater than the threshold a, the process continues to step 96 to drop the identifier as having insufficient data and proceeds to the next identifier at step 88. If a sufficient number of records exists at step 94, the process continues to step 98 to determine whether the sum of the hours on battery is less than or equal to the threshold h. If the hours on battery is less than or equal to the threshold h, the process continues to step 100 to classify the user of the system as a battery non-user and then proceeds to the next system at step 88. If at step 98 the hours on battery is greater than h, the process continues to step 102 to determine if the ratio of hours on battery over hours on is less than or equal to the threshold x. If so, the process continues to step 104 to classify the end user associated with the system as a rare battery user and the process continues to the next record at step 88. If the ratio of hours on over hours on battery is greater than x, the process continues to step 106 to store the identifier as an end user who is a battery user and continues to the next record at step 88. Once all records are complete, at step 108 a list is prepared of systems having end users who are heavy battery users. The users identified as non-battery users or rare-battery users can be encouraged to switch to a lower capacity battery, low cost battery, or a appropriate information handling system.

Note that analysis of battery usage data generally applies to analysis of any internal power source that provides power to operate a system for a limited time and can include other devices that cooperate with the internal power source, such as an external adapter. The internal power source evaluation includes the type of internal power source, such as a manufacturer name or a classification based upon power ratings, such as storage capacity, discharge rate, charge rate, number of battery cells, etc. . . .

Figure 7:
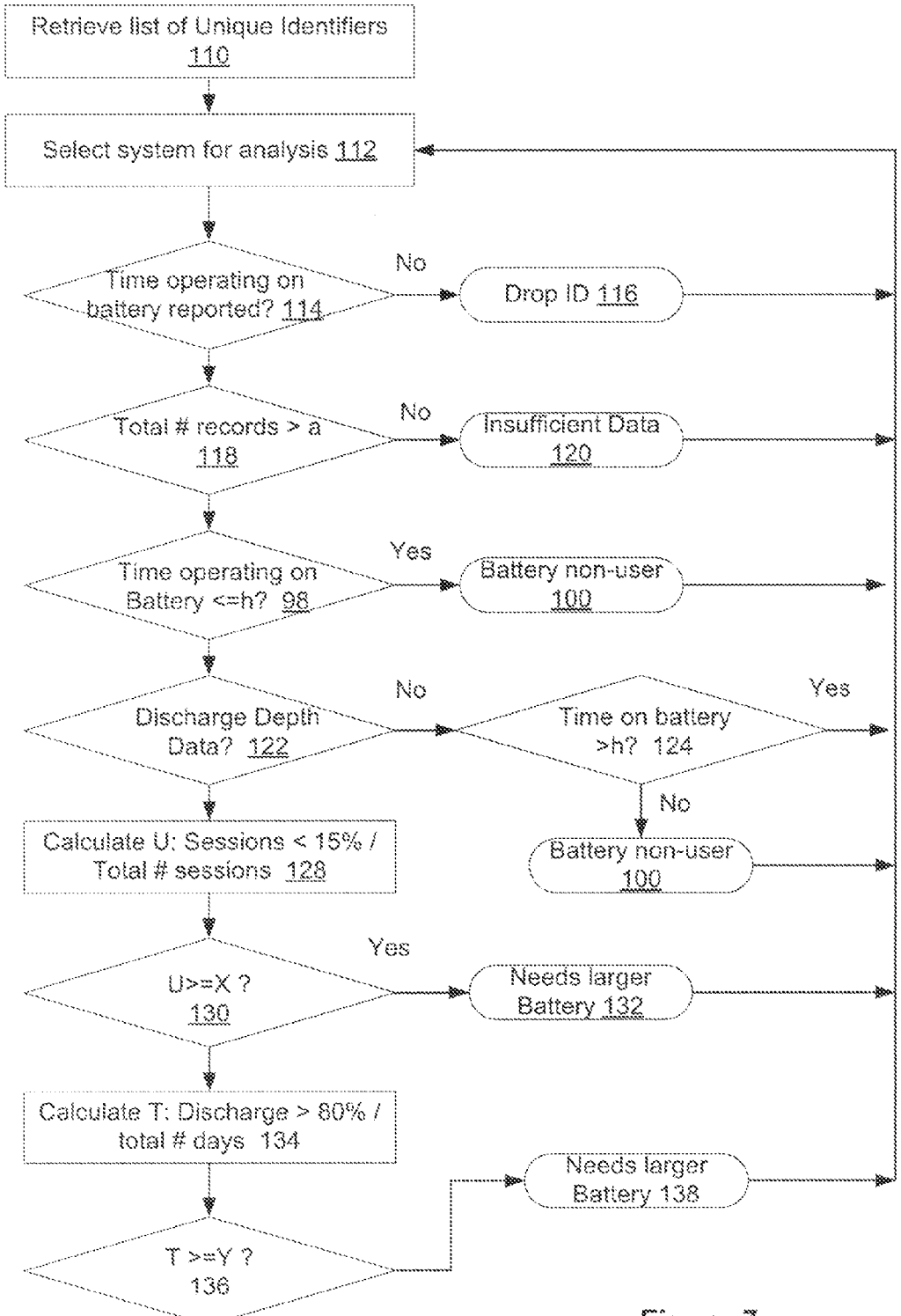
FIG. 7 depicts a flow diagram of another example embodiment of a process for selecting battery configurations based upon usage data.

Referring now to FIG. 7, a flow diagram depicts another example embodiment of a process for selecting battery configurations based upon usage data, such as hours on battery, number of battery sessions and discharge session depth.

Summary parameters for use in analysis include: cumulative number of discharge sessions over time t that end with less than a predetermined charge, such as 15%, with the discharge determined no matter the starting charge level at discharge or the number of battery sessions involved; and the cumulative number of discharge sessions over time t that result in greater than a predetermined charge, such as 80% discharge of the battery in a single session regardless of the starting charge level. Alternative summary parameters may be selected as desired to define a given battery usage scenario. The process starts at step 110 with retrieval of a list of unique identifiers of information handling systems having monitored usage data. At step 112 a unique identifier is selected for analysis. At step 114, a determination is made of whether the hours operating on battery for the information handling system is tracked, and if not the process continues to step 116 to drop the identifier and returns to step 112 for the next identifier. At step 118, the total number of records for the identifier is compared with threshold a and, if not greater than a, the process continues to step 120 to present that not enough data is present and returns to sep 112 for the next identifier. If enough records exist at step 118, the process continues to step 122 to determine whether usage data is available for discharge depth on the information handling system. If discharge depth usage data is not available, the process continues to step 124 for a more limited analysis of comparing average hours on battery with a threshold h. If average hours on battery is greater than h, the end user associated with the information handling system is classified as a high battery user and the process returns to step 112 for the next unique identifier.

If at step 122 discharge data is available, then the process continues to step 128 to calculate U, which is the ratio of discharge sessions that ended with less than the predetermined discharge level, such as 15% power versus total number of sessions. If the ratio U is not greater than or equal to a threshold ratio x, then at step 132 the user associated with the information handling system is classified as in need of a larger battery. If the ratio U is greater than or equal to the threshold x at step 130, the process continues to step 134 to analyze the number of discharges. In the example embodiment of FIG. 7, a value T is calculated by the count of discharge depths greater than the predetermined discharge level, such as 80%, divided by the total number of days monitored. If the calculated value t is greater than or equal to a threshold Y, then the user is classified as needing a larger battery. If the calculated value T is not greater than or equal to the threshold Y, then the users current battery is adequate. The process then returns to step 112 to analyze the next unique identifier.

In one embodiment, battery usage data is monitored in four general categories and then applied in plural analysis to suggest a battery configuration with a monitored information handling system. One general category of battery usage data is user behavior, including time spent operating on a battery, length of discharge sessions, number of discharge sessions and relative state of battery charge as indicated by charge and discharge patterns over time. A second general category of battery usage data is power related parameters such as current, voltage, load, charge power, charge rate and adapter wattage. A third general category of battery usage data is configuration data, such as battery capacity in Watt-hours, number of battery cells, unique battery identifier, battery manufacturer, battery part number, date of manufacture, battery location in system chassis and battery chemistry. A fourth general category of battery usage data is service life related, such as battery charge cycles, full charge capacity and time of the battery in the field. Based on the battery usage data, plural user profile identification modules are run to analyze the battery usage data and associated the user with a classification of end user type. For example, the process depicted by FIG. 6 identifies end users who use a portable information handling system as a desktop replacement by rarely using the battery to power the information handling system. The process depicted by FIG. 7 identifies end users who rely heavily upon a battery by analyzing battery discharge depth. Other types of user profile identification modules analyze usage data to classify end users as needing more battery capacity, needing faster battery charge times, needing adapters with higher power ratings, needing adapters that charge from automobile power sources, needing less discharge capacity and needing greater battery discharge capability. By running an analysis for each of plural user profiles, the profile that most accurately reflects the end user's usage data may be selected to help configure the end user's legacy or replacement portable information handling system with an appropriate battery.

Figure 8:
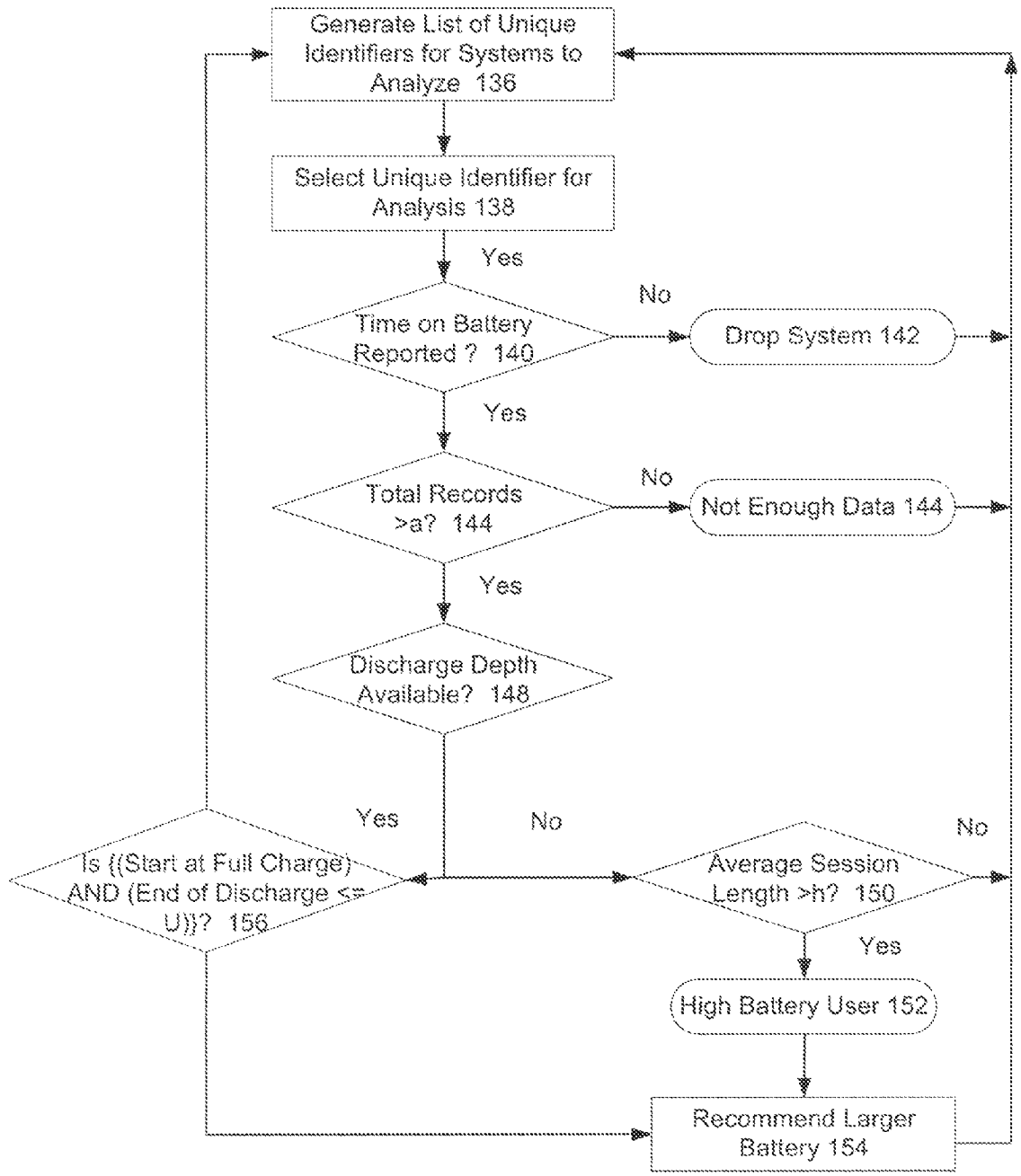
FIG. 8 depicts a flow diagram of a process for identifying a user profile in which an end user associated with an information handling system has a need for a larger battery.

Referring now to FIG. 8, a flow diagram depicts a process for identifying a user profile in which an end user associated with an information handling system has a need for a larger battery. The process begins at step 136 with a list of unique identifiers for analysis and proceeds to step 138 for selection of a system for analysis. At step 140, a determination is made of whether operating time was monitored at the information handling system, such as with hours of operating time having the system powered by the battery. If no, the process continues to step 142 to drop the system from analysis and returns to step 138 to select the next system for analysis. If at step 140 operating time on battery is reported, the process continues to step 144 to determine if the total number of records for the system is greater than a threshold. If no, the process continues to step 146 to indicate that the data is not sufficient, such as where the data does not offer adequate statistical significance, and the process returns to step 138. If an adequate number of records exists at step 144, the process continues to step 148 to determine if discharge depth usage data is available. If discharge depth usage data is not available, the process continues to step 150 to evaluate end user battery usage based upon battery sessions. At step 150 a determination is made of whether the end user has average battery sessions of greater than a threshold length of h. If no, the process returns to step 138. If average battery sessions are greater than the threshold, the process continues to step 152 to classify the end user associated with the information handling system as a high battery user and step 154 to recommend a larger battery or a secondary battery for the end user. If at step 148 discharge depth usage data is available, the process continues to step 156 to determine whether the end user has a predetermined number of discharges that indicate high usage of available battery capacity. For example, a determination is made of whether a threshold number of discharges occur that start with full charge and end with less than a predetermined charge, such as less than 15%. Alternative thresholds include total number of discharges that are greater than 80% of whatever initial charge existed when the discharge began, and total number of discharge to 15% of battery charge capacity remaining. If the determination at step 156 is met, the process continues to step 152 to classify the end user associated with the information handling system as a high battery user. If the determination at step 156 is no, the process returns to step 138 to analyze the next system.

Figure 9:
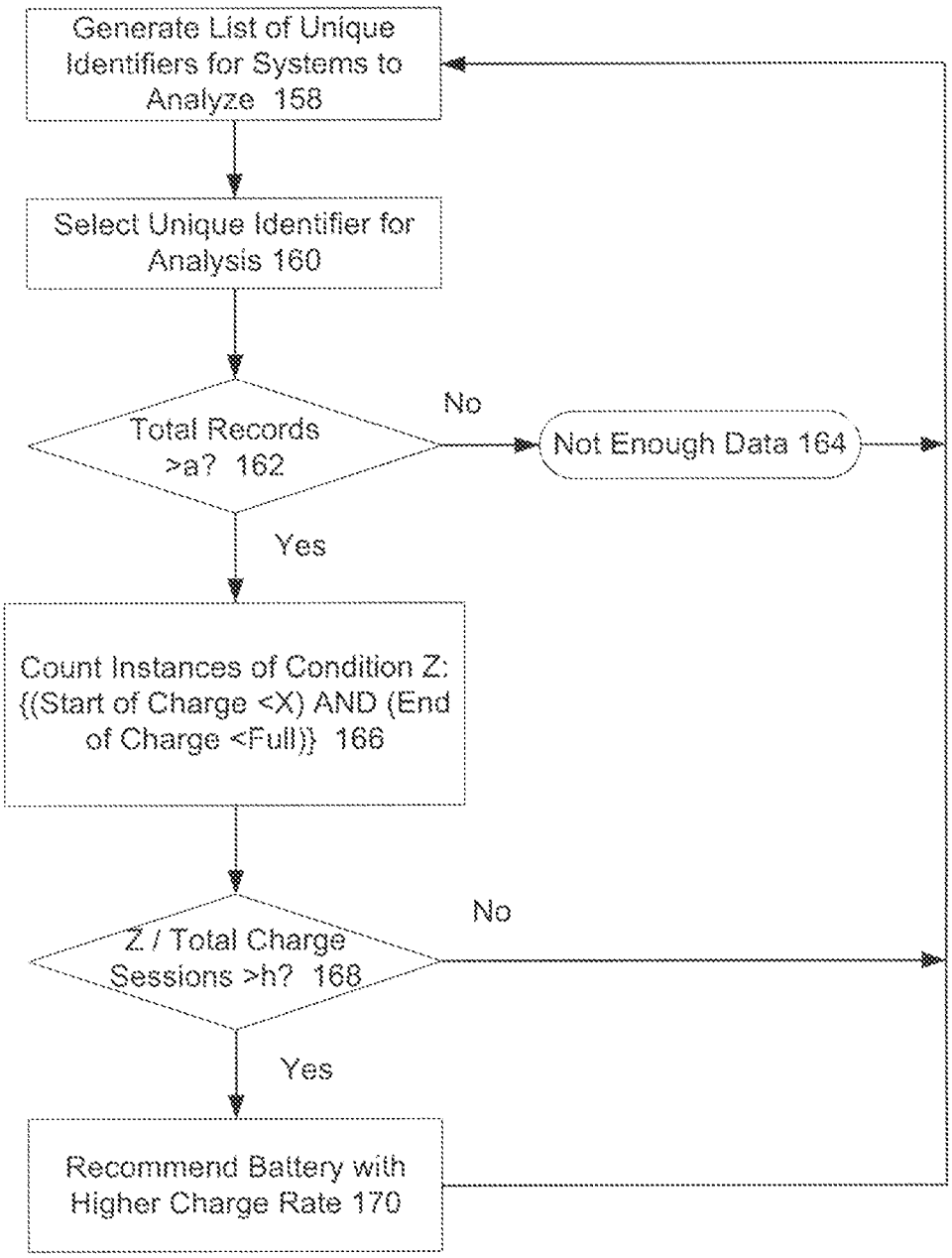
FIG. 9 depicts a flow diagram of a process for identifying a user profile in which an end user associated with an information handling system has a need for a battery that charges more rapidly.

Referring now to FIG. 9, a flow diagram depicts a process for identifying a user profile in which an end user associated with an information handling system has a need for a battery that charges more rapidly. The process begins at step 158 with a list of information handling systems for analysis. At step 160 a system is selected for analysis based upon a unique identifier of the system. At step 162 a determination is made of whether the system has an adequate total number of records to allow analysis, such as greater than a threshold a, and if not the process continues to step 164 to determine that not enough data exists and to step 160 to analyze the next system. If an adequate number of records exists at step 162, the process continues to step 166 to analyze the frequency with which the battery is incompletely charged. For example, a count is made of the number of instances in which a battery charge is initiated with less than a predetermined charge present in the battery, such as less than 80% charged, and ends with less than a full charge of the battery. At step 168 the number of incomplete charges divided by the total number of charge sessions is analyzed to determine if it is greater than a threshold h. If no, the process returns to step 160 to analyze the next system. If the number of incomplete charges is greater than the threshold, the process continues to step 170 to recommend that the end user have a battery capable of a higher charge rate, and the process then continues to step 160 to analyze the next system.

Figure 10:
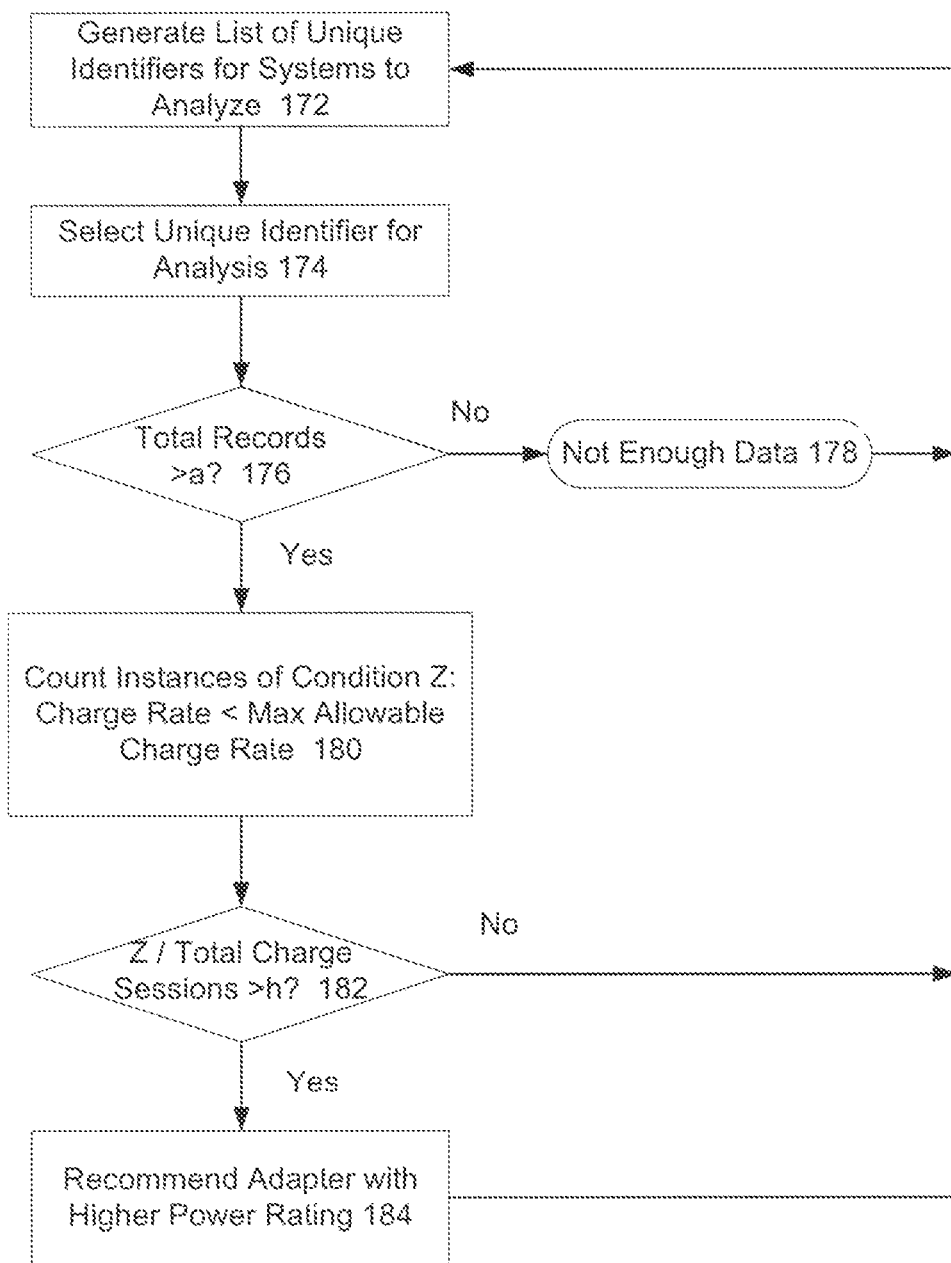
FIG. 10 depicts a flow diagram of a process for identifying a user profile in which an end user associated with an information handling system has a need for a power adapter with a higher power rating.

Referring now to FIG. 10, a flow diagram depicts a process for identifying a user profile in which an end user associated with an information handling system has a need for a power adapter with a higher power rating, such as will provide a more rapid battery charge when a system is operating on external power. The process begins at step 172 with a list of unique identifiers for systems to analyze. At step 174 a system is selected for analysis and, at step 176 the number of records for the system is compared with a threshold number to determine if an adequate number of records exists for analysis. If the number of records is insufficient for analysis, the process continues to step 178 to determine that not enough data exists for analysis and then to step 174 to proceed to the next record. If an adequate number of records exists, the process continues to step 180 to analyze situations indicative of insufficient external power. For example, the total number of instances is counted for conditions where the charge rate applied to the battery is less than the maximum allowable charge rate. At step 182, a determination is made of whether the ratio of the number of instances of charges at less than the maximum allowable charge and the total number of charge sessions is greater than a threshold value. If no, the charger is deemed adequate and the process returns to step 174 to analyze the next system. If the determination at step 182 is yes, the process continues to step 184 to recommend an external power adapter with a higher power rating. In one alternative embodiment, an additional determination is made of whether movement is detected while they system is in use, such as a GPS position change, a WiFi position change or an airplane mode that turns antennae off. Systems that are operational during movement are recommended to include a portable charger system, such as an auto charger.

Figure 11:
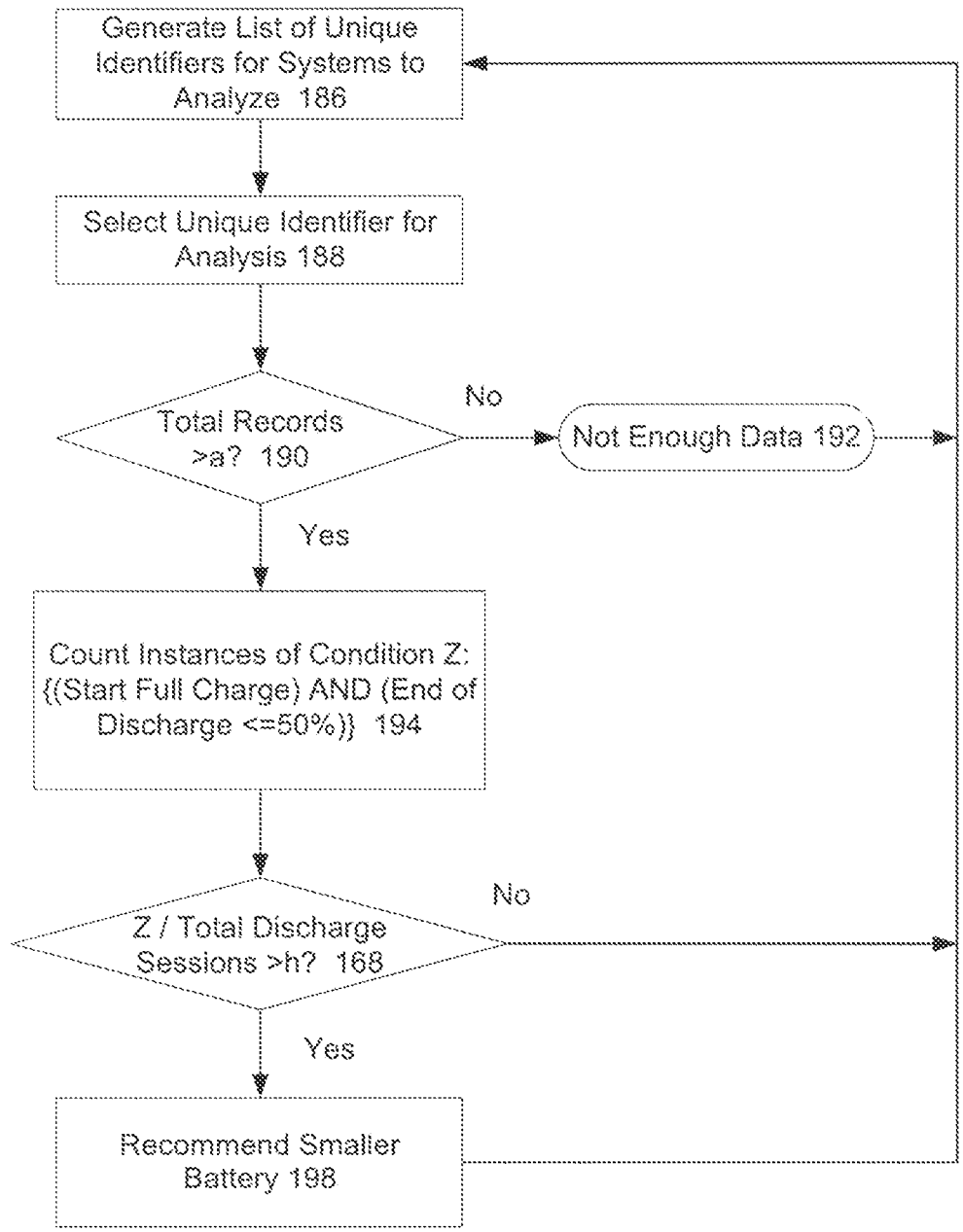
FIG. 11 depicts a flow diagram of a process for identifying a user profile in which an end user associated with an information handling system has a battery that is larger than needed.

Referring now to FIG. 11, a flow diagram depicts a process for identifying a user profile in which an end user associated with an information handling system has a battery that is larger than needed, such as where the end user can save cost and system weight by installing a smaller battery. The process begins at step 186 with a list of unique identifiers for monitored information handling systems and continues to step 188 for selection of a unique identifier to analyze. At step 190, a determination is made of whether an adequate number of records exists for analysis and, if no, the process continues to step 192 to determine the number of records inadequate and to returns to step 188 for analysis of the next system. If the number of records is adequate at step 190, the process continues to step 194 to count the total instances indicative of only a partial battery discharge so that the battery in the system is likely larger than the end user needs. For example, the total number of instances is counted in which a battery discharge begins with a full battery charge and ends with at least a predetermined charge, such as a discharge of less than 50%. At step 196 a determination is made of whether the ratio of the number of partial battery discharges and the total number of discharge sessions is greater than a threshold value. If no, the process returns to step 188 to select the next unique system for analysis. If yes at step 196 the process continues to step 198 to recommend a smaller battery to the end user and then returns to step 188 for analysis of the next system.

Figure 12:
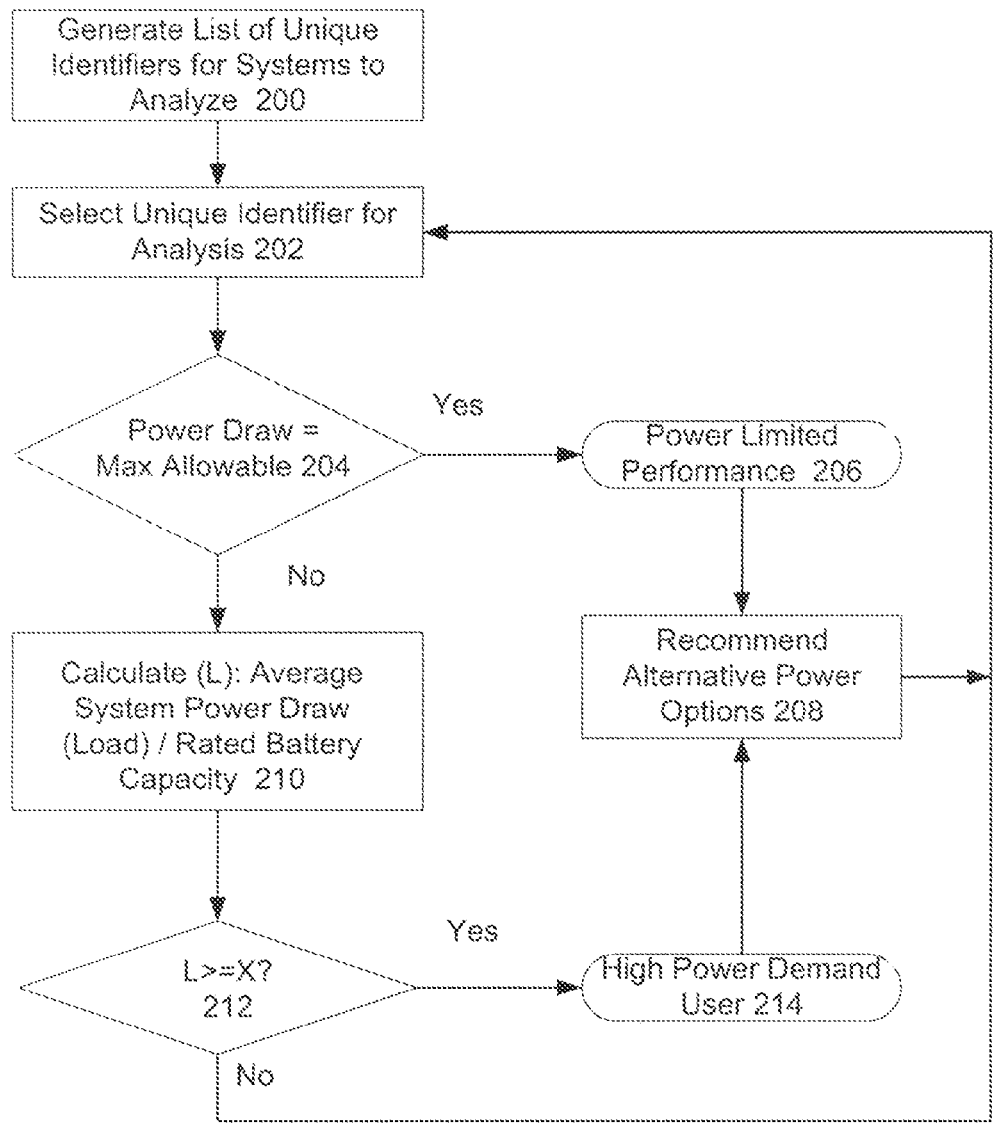
FIG. 12 depicts a flow diagram of a process for identifying a user profile in which an end user associated with an information handling system has a greater power demand.

Referring now to FIG. 12, a flow diagram depicts a process for identifying a user profile in which an end user associated with an information handling system has a greater power demand. The process begins at step 200 with a list of unique identifiers for information handling systems to analyze and continues to step 202 for selection of a system for analysis. At step 204, a determination is made of whether an instance exists in which system power draw equals the maximum allowable load on a battery power source. If the determination at step 204 is yes, the process continues to step 206 to classify the user as power limited since the user's system is constrained by the available power and at step 208 a recommendation is made that the user obtain a higher capacity battery or switch to an appropriate information handling system. If the determination at step 204 is no, the process continues to step 210 to calculate the ratio of the average system power draw to the rated battery capacity, or other indicator that power drawn might be constrained by battery size. At step 212, a determination is made of whether the indication of power drawn relative to battery discharge capability is greater than a threshold. If yes, the process continues to step 214 to classify the end user as a high power demand use and then to step 208 to recommend a battery with greater capacity or other options. If the determination at step 212 is no, the process returns to step 202 to analyze the next system.

Although the present invention has been described in detail, it should be understood that various changes, substitutions and alterations can be made hereto without departing from the spirit and scope of the invention as defined by the appended claims.

What is claimed is:

1. A method for configuring plural information handling systems of an enterprise, the method comprising:
   monitoring power usage data of the plural information handling systems during use of the plural information handling systems by plural end users;
   analyzing the power usage data to associate a battery type from plural battery types with each of the plural end users of the information handling systems; and
   configuring the plural information handling systems of the enterprise for use by the plural end users by re-assigning batteries between the plural information handling systems based upon the battery type associated with each of the plural end users.

2. The method of claim 1 wherein the power usage data comprises time operating the information handling system on the battery and time operating the information handling system on external power.

3. The method of claim 1 wherein the power usage data comprises amount of battery discharge before recharge with external power.

4. The method of claim 1 wherein the power usage data comprises information handling system performance degradation due to insufficient battery power, the performance degradation including limited performance or shutdown due to insufficient power.

5. The method of claim 1 wherein each battery type comprises a storage capacity rating.

6. The method of claim 1 wherein analyzing further comprises:
   communicating the power usage data from each of the plural information handling systems to a network location; and
   associating battery types with power usage data by defining groups having related power usage data and associating a battery type with each group.

7. The method of claim 1 wherein configuring the plural information handling systems of the enterprise for use by the plural end users further comprises configuring an information handling system to replace the information handling system of the monitoring with a battery type of the end user associated with the information handling system.

8. The method of claim 1 wherein configuring the plural information handling systems of the enterprise for use by the plural end users further comprises configuring the information handling system with a replacement battery of the battery type of the end user associated with the information handling system.

9. A system for customizing information handling system configurations with improved power source configurations based upon end user power usage patterns, the system comprising:
   plural information handling systems operable to execute instructions stored in memory;
   a monitor stored in memory of each of the plural information handling systems, the monitors operable to execute on the information handling systems to track power usage data for each information handling system and to communicate the power usage data to a usage data analyzer;

a usage data analyzer stored in memory at a network location and operable to accept the power usage data from the plural monitors and to analyze the power usage data to determine plural power usage patterns, each power usage pattern associated with a battery type; and a configuration engine stored in memory and interfaced with the power usage patterns, the configuration engine operable to associate each information handling system with a battery type based upon power usage pattern associated with the information handling system and to re-assign plural battery types between the plural information handling systems based upon the power usage patterns.

10. The system of claim 9 wherein the power usage data comprises time operating the information handling system on the battery versus total time operating the information handling system.

11. The system of claim 9 wherein the power usage data comprises a frequency of battery discharge below a predetermined charge level.

12. The system of claim 9 wherein the power usage data comprises information handling system performance degradation due to insufficient battery power, the performance degradation including limited performance or shutdown due to insufficient power.

13. The system of claim 9 wherein the power usage data comprises a number of battery sessions and a discharge depth for each battery session.

14. The system of claim 9 wherein the configuration engine is further operable to execute on an information handling system based upon an association with an end user.

15. The system of claim 9 wherein the configuration engine is further operable to reassign plural batteries of plural battery types between plural end users of an enterprise by associating end users with battery types.

16. A method for configuring information handling systems with an internal power source, the method comprising:
deploying a monitor to the information handling systems;
monitoring internal power source usage data at each information handling system with the monitor for at least a predetermined time;
comparing at least some of the internal power source usage data from the monitoring with plural thresholds, each threshold associated with an end user classification;
determining an end user classification based upon the comparing; and
re-assigning internal power sources between the information handling systems based upon the end user classification determined for each information handling system.

17. The method of claim 16 wherein the plural thresholds comprise discharge of an internal power source greater than a predetermined amount for a predetermined number of times.

18. The method of claim 16 wherein the plural thresholds comprise a charge rate at an internal power source of less than a maximum allowable charge rate.

19. The method of claim 16 wherein the plural thresholds comprise a power draw from an internal power source of the maximum allowable load of the battery.

* * * * *